Dec. 3, 1946. H. E. KENNEDY 2,411,921
WELDING TRANSFORMER
Filed Feb. 1, 1944
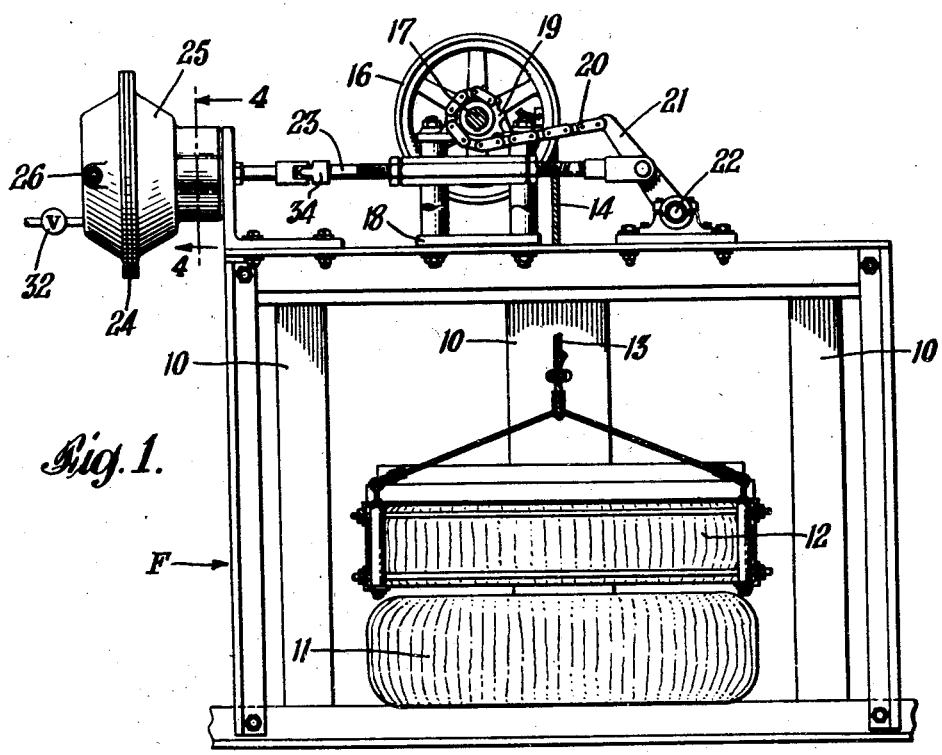
Fig. 1.
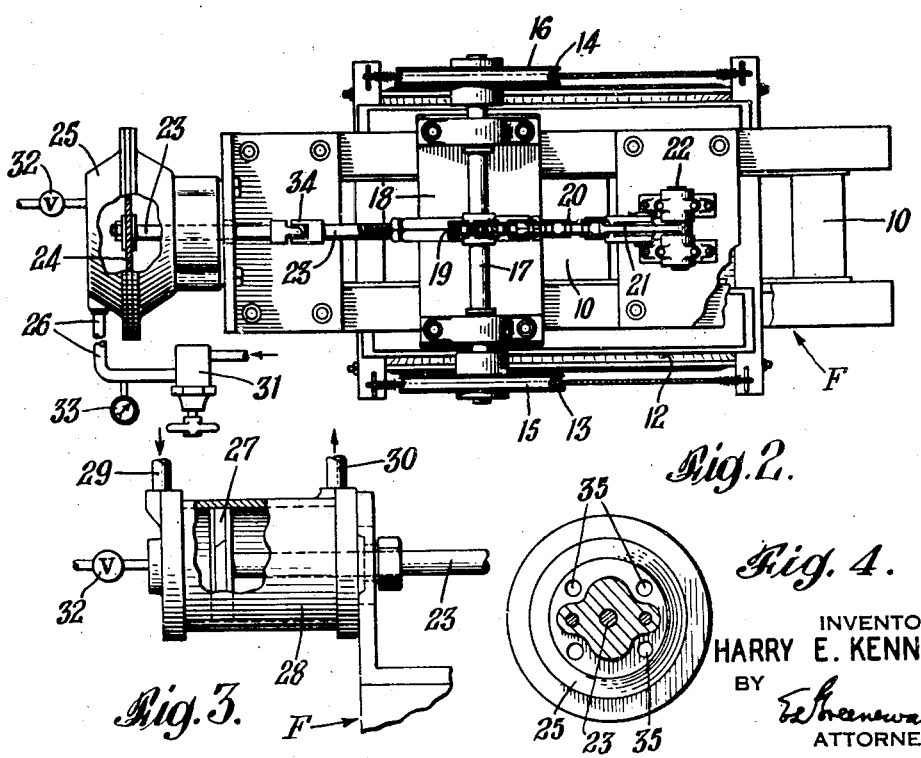
Fig. 2.
Fig. 3.
Fig. 4.
INVENTOR
HARRY E. KENNEDY
BY
ATTORNEY Patented Dec. 3, 1946

2,411,921

UNITED STATES PATENT OFFICE 2,411,921

WELDING TRANSFORMER

Harry E. Kennedy, Berkeley, Calif., assignor to The Linde Air Products Company, a corporation of Ohio Application February 1, 1944, Serial No. 520,691

6 Claims. (Cl. 171—312)

This invention relates to electric welding and refers more particularly to an improved source of alternating electric current for welding.

For alternating electric current welding operations the most generally convenient source of welding current is a transformer. It is desired that a welding transformer be capable of adjustment to different current output levels for use under different sets of welding conditions. It is also desired that the current output level selected for a particular welding operation be maintained substantially constant by the welding transformer throughout the entire welding operation despite fluctuations in line voltage or welding voltage.

One device for supplying alternating electric current at a substantially constant value is the well known "constant current transformer" developed for arc lighting systems. In this transformer, as used for arc-lighting, the primary coil is usually stationary, and the secondary coil is suspended above the primary coil in such manner as to be movable toward or away from the primary coil. A balance between the magnetic repulsion between the coils and the force of gravity acting on the suspended coil is maintained with the aid of counterweights applied to the suspended coil to exert a force on the suspended coil acting in opposition to the force of gravity and in aid of the magnetic force. Once the desired output level is secured these forces act so that it is automatically maintained. Thus, when the counterweight is adjusted so that a desired current flows in the secondary coil, the magnetic repulsion between the primary and secondary coils, opposing the force of gravity and aided by the counterweight, keeps the secondary coil suspended at a fixed level. Any change in electrical characteristics which causes the current flowing in the secondary coil to change causes a change in the magnetic repulsion between the coils, and the secondary coil automatically moves to compensate for this change and to restore the desired balance. For example, an increase in the current flowing in the secondary coil causes an increase in the magnetic repulsion between the primary and secondary coils and a corresponding rise in the position of the secondary coil sufficient to cause the current to return to its desired value. Similarly, a decrease in the current flowing in the secondary coil causes the coil to be lowered until the condition is corrected. The current output level of the transformer is adjusted by changing counterweights.

The constant current transformer thus provides a substantially constant current output level, and this level may be adjusted. However, the device has not been used to any extent for welding principally because the method of adjusting the current output level by adding or subtracting counterweights, is cumbersome and a time-consuming nuisance which renders its use for a welding current source inconvenient and unsatisfactory. The principal object of the present invention is an improved constant current transformer having a more flexible means of adjusting its current output level.

The invention by means of which this object is achieved will be described with reference to the accompanying drawing, in which:

Fig. 1 is a side elevational view of a movable-coil transformer embodying the invention, parts being broken away to show details of construction;

Fig. 2 is a plan view of the transformer shown in Fig. 1;

Fig. 3 is a side elevational view of a modified form of apparatus for regulating the position of the movable coil of the transformer shown in Fig. 1; and Fig. 4 is a view taken on the line 4—4 of Fig. 1 looking in the direction of the arrows.

In accordance with the invention the position of the movable coil of a constant current transformer of the type described is regulated and maintained by compressed air or other fluid acting upon a pressure-responsive device linked to a suitable coil-supporting means. In Figs. 1 and 2 of the drawing a pressure-responsive diaphragm is illustrated. In Fig. 3 a piston operating in a cylinder is shown. Either of these devices may be used in the transformer of the invention.

Illustrative of the invention, the device shown in Figs. 1 and 2 of the drawing is a constant current transformer having a three-legged iron core 10, a stationary secondary coil 11, and a movable primary coil 12 all mounted within a frame F. The primary coil 12 is movably suspended by cables 13, 14 operating on two pulleys 15, 16 mounted on a shaft 17 rotatably mounted on a table 18 secured to the top of the transformer frame F. To a sprocket 19 mounted on the shaft 17 is secured one end of a chain 20 the other end of which is secured to the free end of a lever 21 pivotally mounted at 22 on the frame F. One end of a diaphragm-operated thrust rod 23 is pivotally attached to the lever 21, and the other end of the thrust rod 23 is operatively associated with a diaphragm 24 mounted in a housing 25 attached to the transformer frame F. The right side of the diaphragm housing 25 is open to the atmosphere, being provided with a number of apertures 35 (Fig. 4). The diaphragm 24 may be of the flat type illustrated in Fig. 2 or it may be dished. Because the dished type of diaphragm gives a greater movement under the influence of a change of pressure, it is generally preferred. Similarly, the thrust rod 23 need not perforate the diaphragm as illustrated but may be provided with a large head bearing against the right side of the diaphragm. An inlet 26 for compressed air is provided in the housing 25. Conventional electrical wiring (not shown) is connected to the coils of the transformer.

As illustrated in Fig. 3, the thrust rod 23 may be actuated by a piston 24 operating within a cylinder 28 provided with an air inlet 29 and an outlet 30. If desired, the right side of the cylinder 28 may be completely open to the atmosphere. With this construction, the outlet 30 may be omitted.

Compressed air from a suitable source (not shown) may be supplied to the diaphragm housing 25 or the cylinder 28 through the air inlet 26 or 29, the pressure being adjusted by a conventional pressure regulator 31 (Fig. 2). A bleeder valve 32 is provided, suitably on the diaphragm housing 25 or the cylinder 28, to permit ready variation of the pressure supplied to the diaphragm 24 or the piston 27, and a pressure gauge 33 may be placed in the air line.

In operating the transformer of the invention the position of the primary coil 12 with respect to the secondary coil 11, and hence the current output level of the transformer, is initially adjusted by admitting compressed air to the diaphragm housing 25 or to the cylinder 28. As the pressure on the left side of the diaphragm 24 or piston 27 is increased, the thrust rod 23 is moved in a straight line to the right. The movement of the thrust rod 23 is relatively slight when it is actuated by the diaphragm 24 and must be amplified so that the desired displacement of the secondary coil 12 will be achieved. This is accomplished by the linkage consisting of the lever 21 and the chain 20, the straight line motion of the thrust rod 23 being enlarged and converted to rotating movement of the pulleys 15, 16 by the linkage. With this type of linkage, it is desirable that the thrust rod be jointed as at 34. If the thrust rod 23 is actuated by the piston 27, a greater movement of the thrust rod is obtained than when a diaphragm is used, and a piston of sufficient stroke may be selected that no such linkage is necessary. In such case the thrust rod 23 may be directly connected to the coil-supporting cables 13, 14.

Once the transformer is regulated to deliver current at a desired level, as indicated by an ammeter, the pressure on the diaphragm or piston is maintained constant. The transformer will then automatically deliver current at the desired level despite fluctuations in line or welding voltage, operating in the same way as the conventional constant current transformer. The bleeder valve 32 is always open during use of the transformer so that the automatic lowering of the primary coil 12, which causes movement of the thrust rod 23 to the left, will not cause an increase in pressure on the left side of the diaphragm 24 or piston 27.

If it is desired to decrease the current output level of the transformer the pressure on the left side of the diaphragm 24 or piston 27 is increased by adjusting the pressure regulator 31 to deliver compressed air at a higher pressure. If it is desired to increase the current output level of the transformer the pressure on the left side of the diaphragm 24 or piston 27 is decreased by adjusting the pressure regulator 31 to deliver compressed air at a lower pressure. The bleeder valve 32, being open, permits reduction of the pressure within the diaphragm housing or cylinder. Increasing the pressure applied to the diaphragm 24 or piston 27 causes the primary coil 12 to be raised, and decreasing the pressure on the diaphragm 24 or piston 27 causes the coil 12 to be lowered by gravity. Thus, the position of the primary coil 12 may be regulated simply by varying the fluid pressure on the diaphragm or piston, the fluid pressure acting in the same direction as the magnetic repulsion between the coils and opposed to the force of gravity.

It is particularly pointed out that pressure is applied to only one side of the diaphragm or piston, the left side as illustrated, and that the pressure is opposed by the force of gravity acting on the suspended coil.

The transformer of the invention, by reason of the ease with which it may be adjusted to provide different levels of constant current output, is particularly well adapted to use as a source of welding current and will probably find its greatest field of use in this application, but it may be used to advantage in any application where a current supply that may be maintained constant at any one of several different output levels is desired. Although the operation of the transformer is the same whether or not the primary coil or the secondary coil is stationary, in general it will be found more convenient when the transformer is used for welding that the primary coil be the movable coil. The transformer is connected in the welding circuit in the conventional manner, the secondary coil being connected to the work to be welded.

Although two particular pressure-responsive devices, a diaphragm and a piston, and a particular linkage are disclosed as examples of features of the invention, other similarly-operating devices may be used for controlling the position of the movable coil of the transformer of the invention relative to the stationary coil without departing from the scope of the invention. Similarly, the pressure-responsive device used need not be actuated by compressed air but may be actuated by any suitable fluid under pressure.

I claim:

1. In a constant current transformer comprising a core, a fixed coil, and a movable coil, a pressure-responsive actuating device operatively associated with said movable coil for moving the same, said movable coil being maintained, against the force of gravity, in a desired position with respect to said stationary coil solely by the sum of the forces of pressure applied to said device and of magnetic repulsion between said coils.

2. In a constant current transformer comprising a core, a fixed coil, and a movable coil, a pressure-responsive diaphragm operatively associated with said movable coil for moving the same, said movable coil being maintained, against the force of gravity, in a desired position with respect to said stationary coil solely by the sum of the forces of pressure applied to said device and of magnetic repulsion between said coils.

3. A welding transformer comprising a core, a stationary coil, a movable coil above said stationary coil, and a pressure-responsive actuating device operatively associated with said movable coil, and so constructed and arranged as to move said movable coil away from said stationary coil upon the application of pressure thereto, said movable coil being maintained, against the force of gravity, in a desired position with respect to said stationary coil solely by the sum of the forces of pressure applied to said device and of magnetic repulsion between said coils.

4. A welding transformer comprising a core, a stationary coil, a movable coil above said stationary coil, an actuating diaphragm responsive to fluid pressure, and means operatively associated with said diaphragm and said movable coil so constructed and arranged as to move said movable coil away from said stationary coil upon the application of pressure to said diaphragm, said movable coil being maintained, against the force of gravity, in a desired position with respect to said stationary coil solely by the sum of the forces of pressure applied to said diaphragm and of magnetic repulsion between said coils.

5. A welding transformer comprising a core; a stationary coil; a movable coil above said stationary coil; a pulley above said movable coil; a cable operating on said pulley and suspending said movable coil in position; a pressure-responsive actuating device having a thrust rod movable in a straight line; and a linkage including a lever of the third class so connecting said thrust rod to said pulley as to amplify and to convert straight line motion of said thrust rod into rotating motion of said pulley, said movable coil being maintained, against the force of gravity, in a desired position with respect to said stationary coil solely by the sum of the forces of pressure applied to said device and of magnetic repulsion between said coils.

6. A welding transformer comprising a core; a stationary coil; a movable coil above said stationary coil; a pulley above said movable coil; a cable operating on said pulley and suspending said movable coil in position; an actuating diaphragm responsive to fluid pressure, said movable coil being maintained, against the force of gravity, in a desired position with respect to said stationary coil solely by the sum of the forces of pressure applied to said device and of magnetic repulsion between said coils; and means operatively associated with said diaphragm and said movable coil to move said movable coil away from said stationary coil upon the application of pressure to said diaphragm, said means including a lever of the third class pivotally mounted at one end and operatively associated with said pulley at its other end and a thrust rod attached at one end to said diaphragm and at its other end pivotally attached to said lever in such manner that straight line motion of said thrust rod is amplified and converted by said lever to rotating motion of said pulley.

HARRY E. KENNEDY.